Jan. 18, 1938.  F. SCHMIDT  2,106,040
BLOWER ROTOR FOR VERY HIGH PERIPHERAL VELOCITY
Filed Jan. 11, 1937
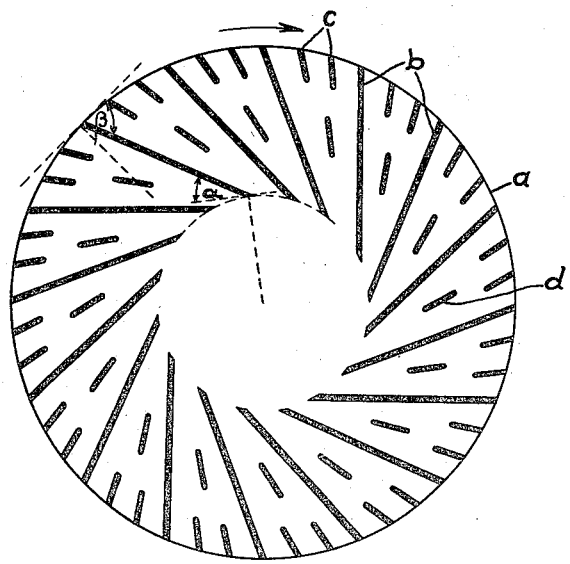
Inventor:
Friedrich Schmidt,
by Harry E. Dunham
His Attorney.

Patented Jan. 18, 1938

2,106,040

UNITED STATES PATENT OFFICE 2,106,040

BLOWER ROTOR FOR VERY HIGH PERIPHERAL VELOCITY

Friedrich Schmidt, Berlin-Karlshorst, Germany, assignor to General Electric Company, a corporation of New York Application January 11, 1937, Serial No. 120,074
In Germany January 22, 1936

1 Claim. (Cl. 230—134)

So far, one has used with centrifugal blowers having peripheral velocities exceeding 300 m/sec. rotors, the vanes of which had a radial direction. This was done especially for reasons of mechanical strength. However, rotors of that type had a poor efficiency since the admission at the radially ending entrance edges is unfavorable.

In order to offset this disadvantage, one has frequently placed ahead, of a blower rotor with radial vanes, i. e. at the rotor entrance, a system of guide vanes. This arrangement has the shortcoming that at the same peripheral velocity, the pressure head of the rotor becomes smaller. In order to create the same end pressure as obtains without the application of a guide-vane system the R. P. M. of the centrifugal blower would have to be raised and this would entail much higher stresses in the material.

According to the invention, these disadvantages are avoided in the following manner: In a blower rotor for very high peripheral velocities, the vanes which are arranged in one plane, are inclined by a certain angle with respect to the peripheral direction, and this entrance angle is dependent upon the air quantity to be drawn and the peripheral velocity, the vane outlet angle being determined by the rectilinear continuation of the entrance-angle line. To avoid eddies in the fluid passing through the blower, guide vanes are provided within the rotor passages and at the outlet of these passages.

The drawing shows a physical embodiment of the invention. $a$ denotes a blower rotor for very high peripheral velocities; $b$ are the plane vanes of that rotor which are inclined with respect to the peripheral direction, and $c$ are the guide vanes at the rotor passage outlet. Within the rotor passages additional guide vanes $d$ are provided in order to avoid eddies in the fluid passing through the rotor. The entrance angle $\alpha$ of the rotor vanes $b$ can be obtained from the velocity triangle in accordance with the air quantity to be drawn and the peripheral velocity at the vane entrance. The outlet angle $\beta$ is determined by the rectilinear continuation of the line of entrance angle $\alpha$.

A blower rotor which is built in this manner permits the maximum pressure increase for the prescribed peripheral velocity, under consideration of the optimum entrance conditions and of the best possible utilization of the strength of the material.

What I claim as new and desire to secure by Letters Patent of the United States, is:

A blower rotor having vanes extending from the inlet to the outlet providing vane channels, short guide vanes within the vane channels extending inward from the outlet, and short guide vanes within the vane channels intermediate the inlet and the inner ends of said first guide vanes.

FRIEDRICH SCHMIDT.